May 13, 1958   F. W. JOHANSEN   2,834,031
CRIB AND PLAY PEN FOR AUTOMOBILES
Filed Sept. 27, 1955
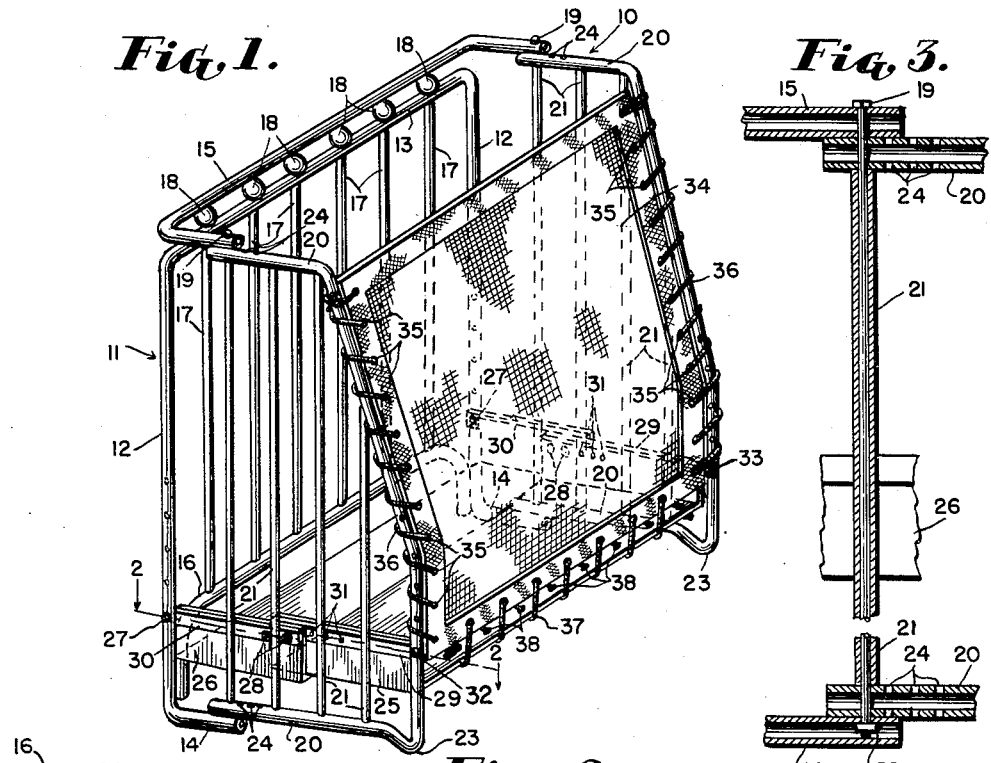
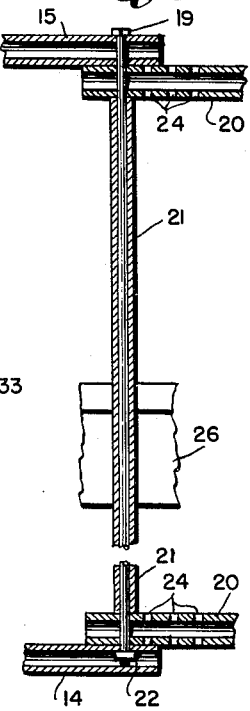
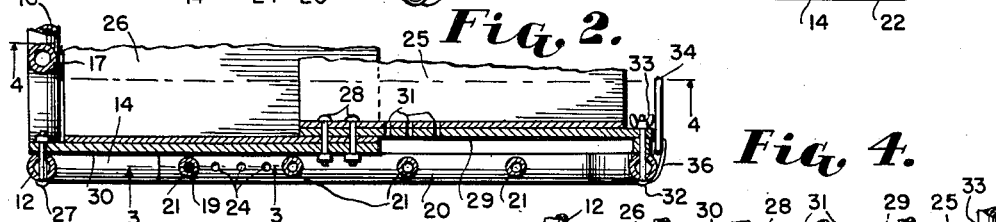
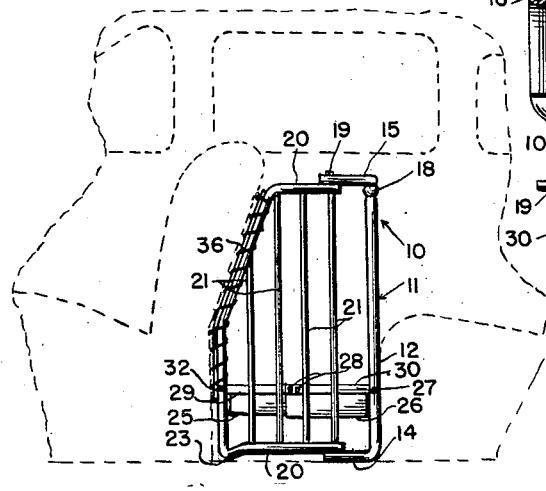
Inventor
Fred W Johansen

United States Patent Office 2,834,031
Patented May 13, 1958

2,834,031

CRIB AND PLAY PEN FOR AUTOMOBILES

Fred W. Johansen, Silver Spring, Md.

Application September 27, 1955, Serial No. 536,945

5 Claims. (Cl. 5—94)

This invention relates to a combined crib and play pen for automobiles and which may be folded into a relatively small package when not in use. More particularly the crib comprises a foldable crib or play pen especially designed for automobiles such that the crib when fully opened occupies a longitudinal portion of the space within the automobile defined by substantially the height of the front seat back and the forward portion of the rear seat cushion such that small children when placed therein may be transported in such vehicles with a maximum of safety whether the occupant is either in a standing or a reclining position.

One of the objects of the present invention is the provision of a new and improved foldable crib and play pen for small children which embodies the structural features defining a walled in upstanding portion and a floor section conforming substantially to the longitudinal portion of the floor space between the front and rear seats of an automobile and which conforms generally to the rear portion of the back of the front seat.

Another object is to provide a crib and play pen for use in an automotive vehicle for the safe transportation of small children which is adaptable for folding into a small package when not in use and which is constructed and arranged to be adjusted to fit conformingly and snugly between the front and rear seats of the vehicle.

Still another object is to provide a new and improved automobile crib and play pen in which means are provided for adjusting the floor portion thereof both laterally and vertically in accordance with the distance between the front and rear seats of the vehicle and the height of the child to be placed therein respectively.

Still other objects, advantages and improvements will become apparent from the following description, taken in connection with the accompanying drawing in which:

Fig. 1 is a view in perspective of the device of the present invention in accordance with a preferred embodiment thereof;

Fig. 2 is a fragmentary view somewhat enlarged taken along the line 2—2 of Fig. 1;

Fig. 3 is an enlarged fragmentary view partially in section of the device of Fig. 1 taken along the line 3—3 of Fig. 2;

Fig. 4 is a view partially in section of the device of Fig. 1 taken along the line 4—4 of Fig. 2;

Fig. 5 is a view of the device of Fig. 1 in an upright position as installed in an automobile; and Fig. 6 is a view of the device in a folded position.

Referring now to the drawing for a more complete understanding of the invention and more particularly to Fig. 1 thereof, there is shown thereon the crib and play pen of the present invention, hereinafter referred to as a crib, and designated generally by the numeral 10, the device comprising an upstanding tubular frame member 11 having two parallel legs 12 interconnected by a transverse portion 13. The lower ends of the legs 12 are L-shaped to form a pair of feet 14 upon which the rear portion of the crib is adapted to rest. There is also provided a top member 15 of substantially the same longitudinal dimensions as the frame 11 and a lower member 16 secured in any suitable manner to the frame member 11 substantially as shown. A plurality of upstanding rods 17 are secured and interconnect member 16 and frame 11, the rods extending through frame 11 into aligned apertures formed within the top member 15 to which the rods 17 are also secured. Preferably though not necessarily a plurality of colored balls 18 are assembled on the rods 17 intermediate the frame 11 and top member, the purpose of which is to provide both a source of amusement for the child and to improve the appearance of the crib. Each of the legs 12 is provided with a plurality of mutually aligned apertures, the purpose of which will be more clearly apparent as the description proceeds.

Pivotally secured to the top member 15 and feet portions 14 as by the elongated bolts 19 are a pair of tubular side members 20 formed substantially as shown and provided with a plurality of upstanding rods 21 secured thereto. The members 15 and 14 are also provided with suitably aligned apertures through which the bolts 19 are adapted to pass, the lower end of each of the bolts being threaded preferably into a nut 22 secured interiorly within each of the legs 14 as shown. The side members 20 are each provided with a downwardly projecting portion 23 formed thereon upon which the forward portion of the crib is adapted to rest when installed in an automobile. A plurality of apertures 24 are also provided in each of the side members 20 whereby the lateral dimension of the crib may be adjusted to conform with the distance between the front and rear seats of the automobile within which the crib is to be installed.

A floor section comprising members 25 and 26 is also provided, the member 26 being pivotally secured to the legs 12 of the frame 11 as by the bolts 27 and secured to the member 25 telescoped therein as by the bolts 28, a pair of bars 29 and 30 being employed to provide additional rigidity to the floor when assembled. Additional apertures generally designated by the numerals 31 are provided within the members 25 and 29 whereby the floor may be adjusted to conform with the adjusted position of the side members 20 to which the members 25 and 29 are secured by the pair of bolts 32 and wing nuts 33 illustrated.

The forward upstanding portion of the crib is enclosed by a flexible cover 34 composed of fabric such as canvas, a plastic material suitable for the purpose, or the like and provided with a plurality of apertures or eyelets 35 formed therein whereby the cover may be secured to the side members 20 as by the lashings 36 and, if desired, to the floor member 25 as by the lashing 37, a plurality of apertures or eyelets 38 being formed in the member 25 for this purpose.

When it is desired to fold the crib into a small package, the lashing 37, if any, is removed, the wing nuts 33 are loosened and the bolts 32 are removed. The floor is now pivoted about the bolts 27 and folded upwardly against the frame 11 and the side members 20 are folded inwardly to the position shown on Fig. 6. The cover 34 may be folded between the side members and the frame, if desired, without the necessity of removing the lashings 36. The crib is now in a folded condition for transportation within the trunk of the car or by a baggage carrier secured to the top thereof or for storage otherwise.

The crib may be composed of any metal suitable for the purpose, such for example, as aluminum or the like. When employing aluminum for the upstanding and base sections of the crib a strong light weight structure is obtained which could be folded and unfolded with a minimum of effort and easily transported from a storage place to the automobile or vice versa.

From the foregoing it will be clearly apparent that a novel folding crib or play pen has been provided in which a small child may be safely transported in an automobile and in which the child is protected from injury due to sudden stoppage of the vehicle by a flexible cover secured across the side portions thereof and forming a front wall, and in which the child is confined within the crib by adjacent walled portions in such a manner that when in a standing position only the upper portion of the child's body projects above the upper portion of the crib and thus the child may stand and observe his environs through the windows of the car without the danger of physical injury.

Whereas the invention has been described with particular reference to one example thereof which gives satisfactory results, it is not so limited as it will be apparent to one skilled in the art, after understanding the invention, that various changes and modifications may be made without departing from the spirit and scope of the invention and it is my intention, therefore, in the appended claims to cover all such changes and modifications.

What I claim as new and desire to be secured by Letters Patent of the United States is:

1. An automobile crib having an upstanding rear wall and a pair of side walls pivoted thereto, each of said side walls having a front edge comprising a vertical portion and an inclined portion contiguous therewith and conforming generally to the exterior contour of the rear surface of the back of the front seat of the automobile, a flexible wall lashed to the front edges of said side walls, a base member pivotally secured to said rear wall and detachably secured to said side walls such that the base member is disposed in a horizontal plane when the crib is installed in said automobile, each of said side walls having a foot formed thereon contiguous with the front edge thereof for engagement with the floor of the automobile.

2. A crib according to claim 1 in which means are provided for lashing one edge portion of said flexible wall to the front edge of said base member intermediate said side walls.

3. A play pen for installation between the front and rear seats of an automobile comprising, in combination, a rear frame of tubular construction and having a pair of legs with L-shaped feet formed integrally therewith, a cross member interconnecting the legs of said frame, a plurality of bars secured to said frame and to said cross member in a manner to form a rear wall, said bars extending beyond the upper portion of said wall, a tubular member secured to the ends of said bars above said wall, a pair of barred tubular side members pivotally secured to the end portions of said second member, each of said side members comprising a vertical tubular portion and an inclined tubular portion contiguous therewith for close fitting engagement with the rear surface of the front seat of the automobile, an adjustable floor member comprising two telescoped sections and supporting bars therefor, means for clamping said sections to each other and supporting the bars in a predetermined selected position such that one dimension thereof conforms substantially to the distance between the front and back seats of the automobile, means for detachably securing said floor member to said side members, and a sheet of flexible material lashed to said side members at said vertical and inclined portions thereof and one of said floor sections in a manner to form a front wall in closely spaced adjacency to the rear surface of the back of the front seat when the play pen is installed in the automobile.

4. A pen according to claim 3 in which said front wall is composed of a fabric having a plurality of eyelets disposed along three edge portions thereof, and a cord disposed within said eyelets for lashing said front wall to said side and floor members.

5. An automobile crib comprising a back member having a plurality of vertical bars and a pair of horizontal members to which the bars are secured, a pair of tubular barred side members pivoted to said back member about a pair of vertical axes, each of said side members having a front vertical edge portion and a front inclined edge portion contiguous therewith for close fitting engagement with the rear surface of the front seat of an automobile when installed therein, a bottom pivoted to said back member for inward movement with respect thereto, means for detachably securing said bottom to the side members whereby the bottom is in a horizontal position when the crib is installed in the automobile and the side members and bottom may be folded inwardly against the back member when the bottom has been disconnected from the side members, and a flexible cover secured to the front edge portions of said side members and the front edge of said bottom thereby to form a front wall in closely spaced adjacency to the rear of the back portion of the front seat of an automobile when the crib is installed therein.

References Cited in the file of this patent

UNITED STATES PATENTS

| | | |
|---|---|---|
| 849,118 | Garber | Apr. 2, 1907 |
| 1,139,099 | Brouyette | May 11, 1915 |
| 1,201,923 | Bent | Oct. 17, 1916 |
| 1,293,001 | Bent | Feb. 4, 1919 |
| 1,344,588 | Kozik | June 22, 1920 |
| 1,402,767 | Haynes | Jan. 10, 1922 |
| 1,516,322 | Beaucoudray | Nov. 18, 1924 |
| 1,959,974 | Westgate | May 22, 1934 |
| 2,637,857 | Isaacson | May 12, 1953 |